United States Patent [19]

Izumi

[11] Patent Number: 5,245,653
[45] Date of Patent: Sep. 14, 1993

[54] MEMORY CARD CONNECTABLE TO A TELEPHONE

[75] Inventor: Michihiro Izumi, Yokohama, Japan

[73] Assignee: Canon Kabushiki Kaisha, Tokyo, Japan

[21] Appl. No.: 834,850

[22] Filed: Feb. 13, 1992

Related U.S. Application Data

[63] Continuation of Ser. No. 553,647, Jul. 18, 1990, Pat. No. 5,119,414.

[30] Foreign Application Priority Data

Jul. 18, 1989 [JP] Japan .................................. 1-186338
Jul. 20, 1989 [JP] Japan .................................. 1-188565

[51] Int. Cl.⁵ ...................... H04M 1/27; H04M 11/00
[52] U.S. Cl. .................... 379/157; 379/165; 379/90; 379/216
[58] Field of Search ............. 379/157, 156, 165, 91, 379/387, 90, 144, 155, 216

[56] References Cited

U.S. PATENT DOCUMENTS 4,266,102  5/1981  Stanley et al. ................ 379/157
4,879,744  11/1989  Tasaki et al. ................ 379/91 X Primary Examiner—Stafford Schreyer
Attorney, Agent, or Firm—Fitzpatrick, Cella, Harper & Scinto

[57] ABSTRACT

There is provided a key telephone system which can use data registered in a memory card. The system comprises: a main apparatus which has a memory and operates in accordance with the data stored in the memory; and an extension telephone having a receiving circuit to receive data from a memory card, wherein the main apparatus stores the data which was received by the extension telephone from the memory card into the memory. With this system, data such as names, denominations, telephone numbers, and the like of the partners can be registered into a portable device such as a memory card by the keyboard of the extension telephone or by the keyboard of the portable device at a remote location at an arbitrary time.

4 Claims, 10 Drawing Sheets

| | | LED NUMBER | | | | | | |
|---|---|---|---|---|---|---|---|---|
| | | ① | ② | ③ | ④ | ⑤ | ⑥ | ⑦ |
| TRANSMISSION NUMERAL/SYMBOL | 1 | O | O | | | | | |
| | 2 | O | | O | | | | |
| | 3 | | O | O | | | | |
| | 4 | O | | | O | | | |
| | 5 | | O | | O | | | |
| | 6 | | | O | O | | | |
| | 7 | O | | | | O | | |
| | 8 | | O | | | O | | |
| | 9 | | | O | | O | | |
| | 0 | | | | O | O | | |
| | . | O | | | | | O | |
| | = | | O | | | | O | |

O REPRESENTS "LED LIGHT ON"

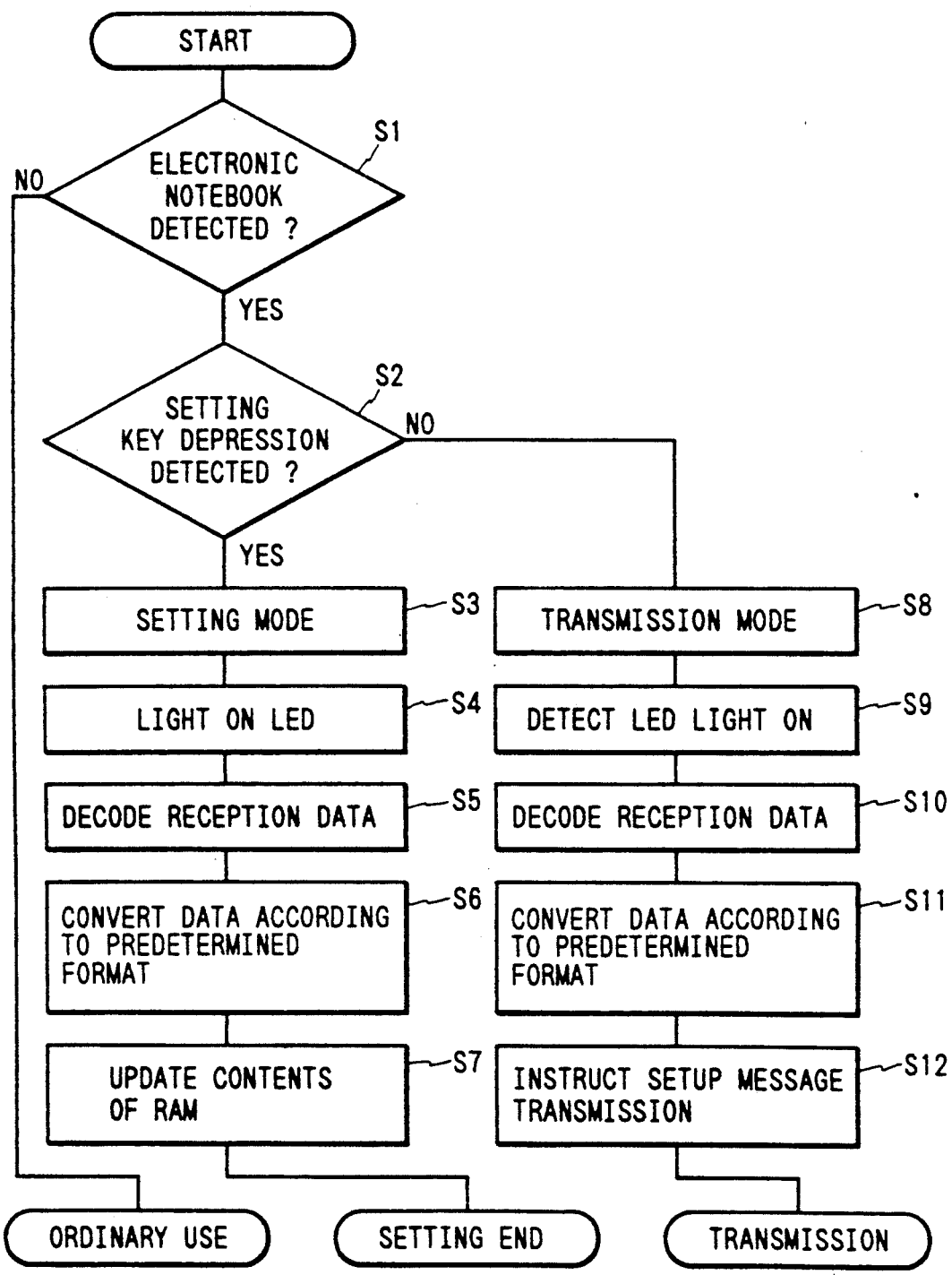

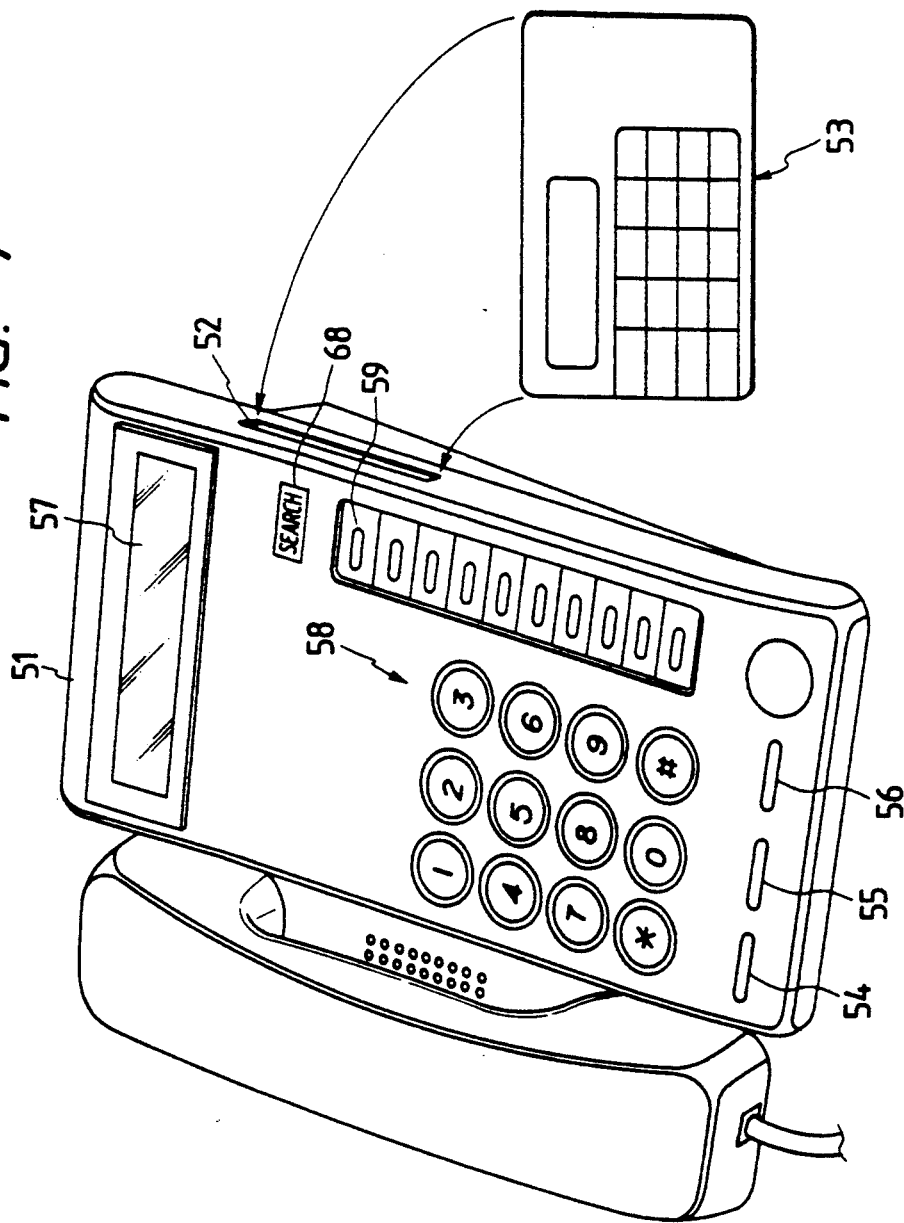

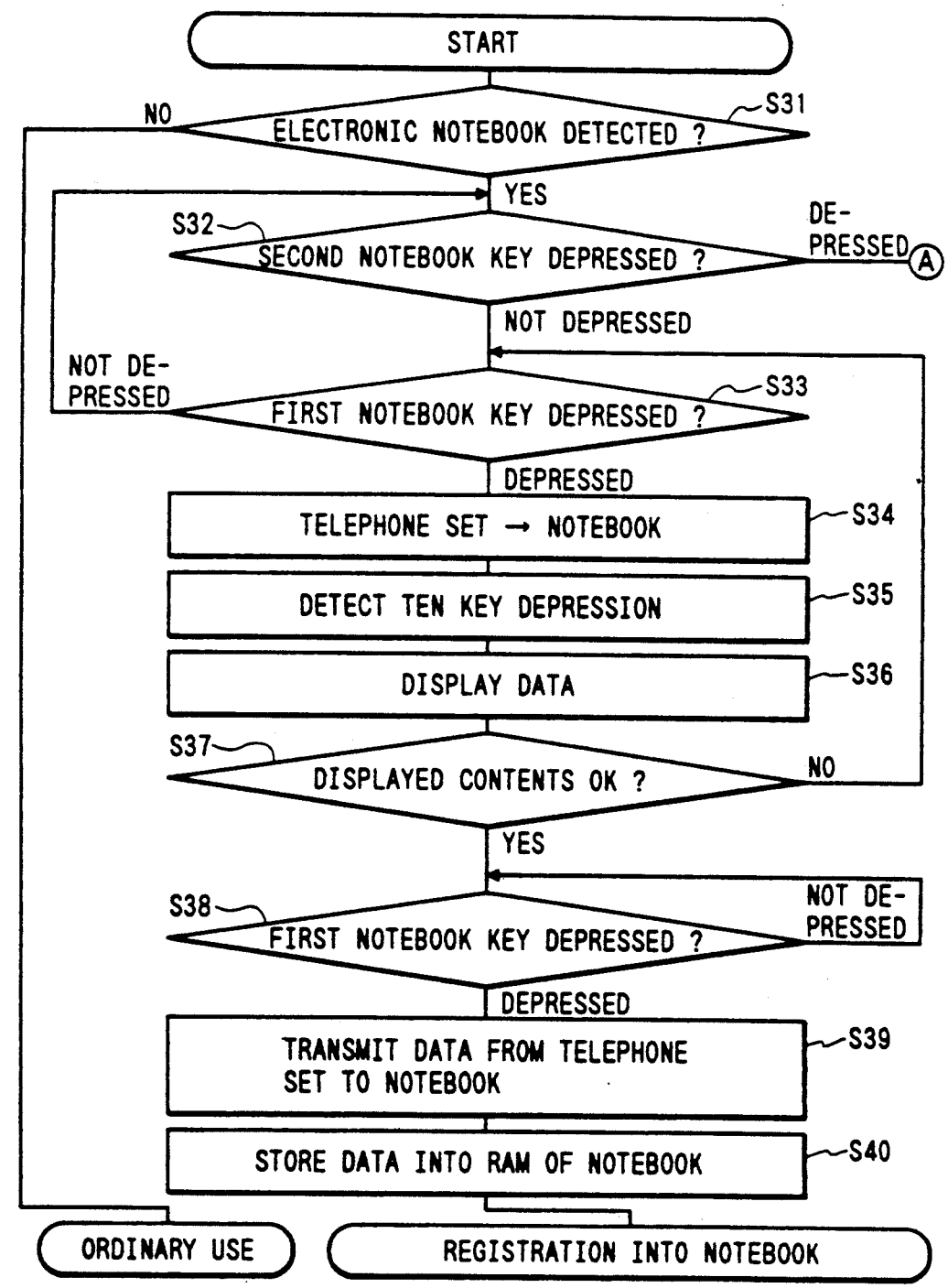

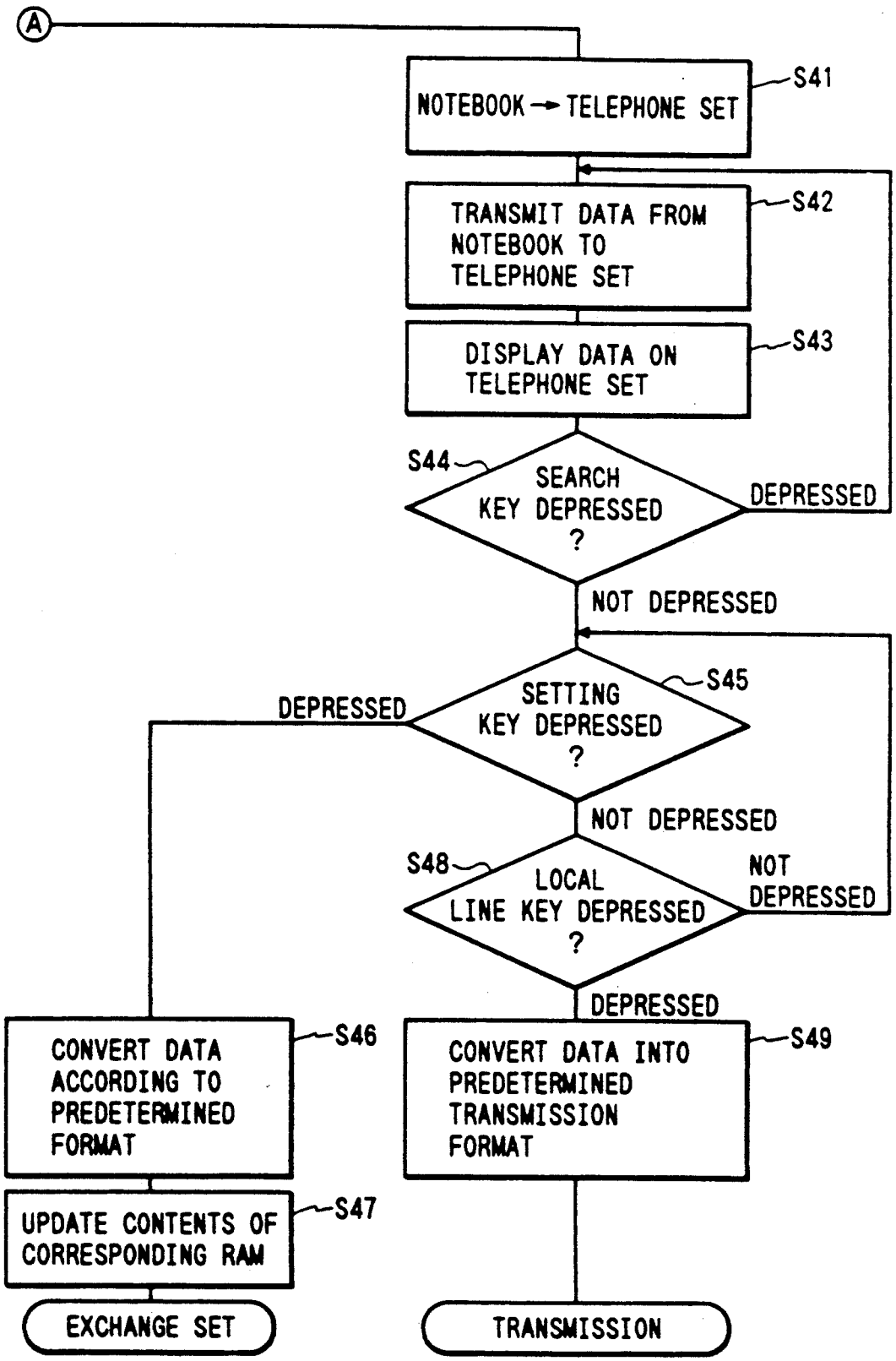

FIG. 10

| A | B | C | | | | |
|---|---|---|---|---|---|---|
| 1 | 2 | 3 | 4 | 5 | 6 | 7 |

FIG. 11

| 0 | 1 | | | | | |
|---|---|---|---|---|---|---|
| 0 | 2 | 1 | 4 | 1 | 4 | 0 |

MEMORY CARD CONNECTABLE TO A TELEPHONE

This application is a continuation of application Ser. No. 07/553,647 filed Jul. 18, 1990, now U.S. Pat. No. 5,119,414.

BACKGROUND OF THE INVENTION

1. Field of the Invention

The present invention relates to a telephone system which can use data registered in a memory card.

2. Related Background Art

Hitherto, in a telephone apparatus or a facsimile apparatus, the functions such as abbreviated dialing, one-touch dialing, and the like are provided. On the other hand, there are limitations in the number of abbreviated dialing telephone numbers and the number of one-touch dialing telephone numbers which can be registered in the apparatus main body itself. Therefore, there is also a system in which a portable electronic notebook is provided separately from the apparatus main body, abbreviated dialing telephone numbers and one-touch dialing telephone numbers are previously registered in the electronic notebook, and a desired telephone number in the electronic notebook is converted into a PB tone and transferred from the electronic notebook to the apparatus main body side, thereby dialing.

On the other hand, in the electronic notebook as mentioned above, the operations to register and access data into/from the electronic notebook itself are executed by various operation buttons provided for the electronic notebook. That is, in the case of executing an originating call by using such an electronic notebook, the various operation buttons provided on the surface of the electronic notebook are observed by the eyes and data is transferred to the telephone side while operating the operation buttons.

On the other hand, since the size of such an electronic notebook is small, the sizes of operation buttons provided on the surface are also small, so that there is a drawback such that the operability is bad.

In addition, hitherto, in a telephone exchange or a button telephone apparatus, it is necessary to set a number of operating modes which are different depending on the users.

For instance, there are operating modes such as a mode to set an extension telephone which should be allowed to ring in response to a terminating call to a certain local line, a mode to set the time or the like, and a mode to set the abbreviated dialing data, and the like. In a large scale exchange, it is necessary to set an extremely large number of modes.

The above data inputting operations are executed by either the user on the basis of the operation manual or the sales person as a kind of service. Particularly, since the ordinary user is unfamiliar with the data inputting operations, it takes a long time to input the data and an erroneous setting can easily occur.

However, in such a conventional technique, as the service functions of the telephone system increase, it is troublesome to input necessary data, so that there are the following drawbacks.

(1) For a sales person, his valuable time is expended to input the data and such data inputting operations become a large burden.

(2) For the user, when he requests for a sales person to input or change data, the user must wait for the visit of the sales person and, after that, the user must describe the contents in detail to the sales person.

SUMMARY OF THE INVENTION

It is an object of the present invention to improve the operability of a telephone or a telephone system.

Another object of the invention is to improve the operability of a portable device which can be set to a telephone and can be used.

Still another object of the invention is to provide a system in which data can be registered into a portable device from a keyboard of a telephone and, further, at a location away from the telephone, data can be registered from the keyboard of the portable device.

Further another object of the invention is to provide a key telephone system in which an extension terminal operates in accordance with data which was received from a memory card.

Further another object of the invention is to provide a key telephone system in which various data can be set into the main apparatus from a memory card through an extension terminal.

Further another object of the invention is to provide an originating call apparatus for executing an originating call to the ISDN in response to a photo signal from a card.

The above and other objects and features of the present invention will become apparent from the following detailed description and the appended claims with reference to the accompanying drawings.

BRIEF DESCRIPTION OF THE DRAWINGS

FIG. 5 is a flowchart in the case where the electronic notebook in the system of the first embodiment is used;

FIG. 7 is a perspective view showing outside appearances of an extension telephone of a telephone system and an electronic notebook according to the second embodiment of the invention;

FIG. 9, consisting of FIGS. 9A and 9B, is a flowchart for explaining the operation in the case where the electronic notebook in the system of the second embodiment is used;

FIG. 10 is a plan view showing an example of the display of transmission data which is registered into the electronic notebook in the system of the second embodiment; and FIG. 11 is a plan view showing an example of the display of setting data which is registered into the electronic notebook in the system of the second embodiment.

DETAILED DESCRIPTION OF THE PREFERRED EMBODIMENTS

First Embodiment

Figure 1:
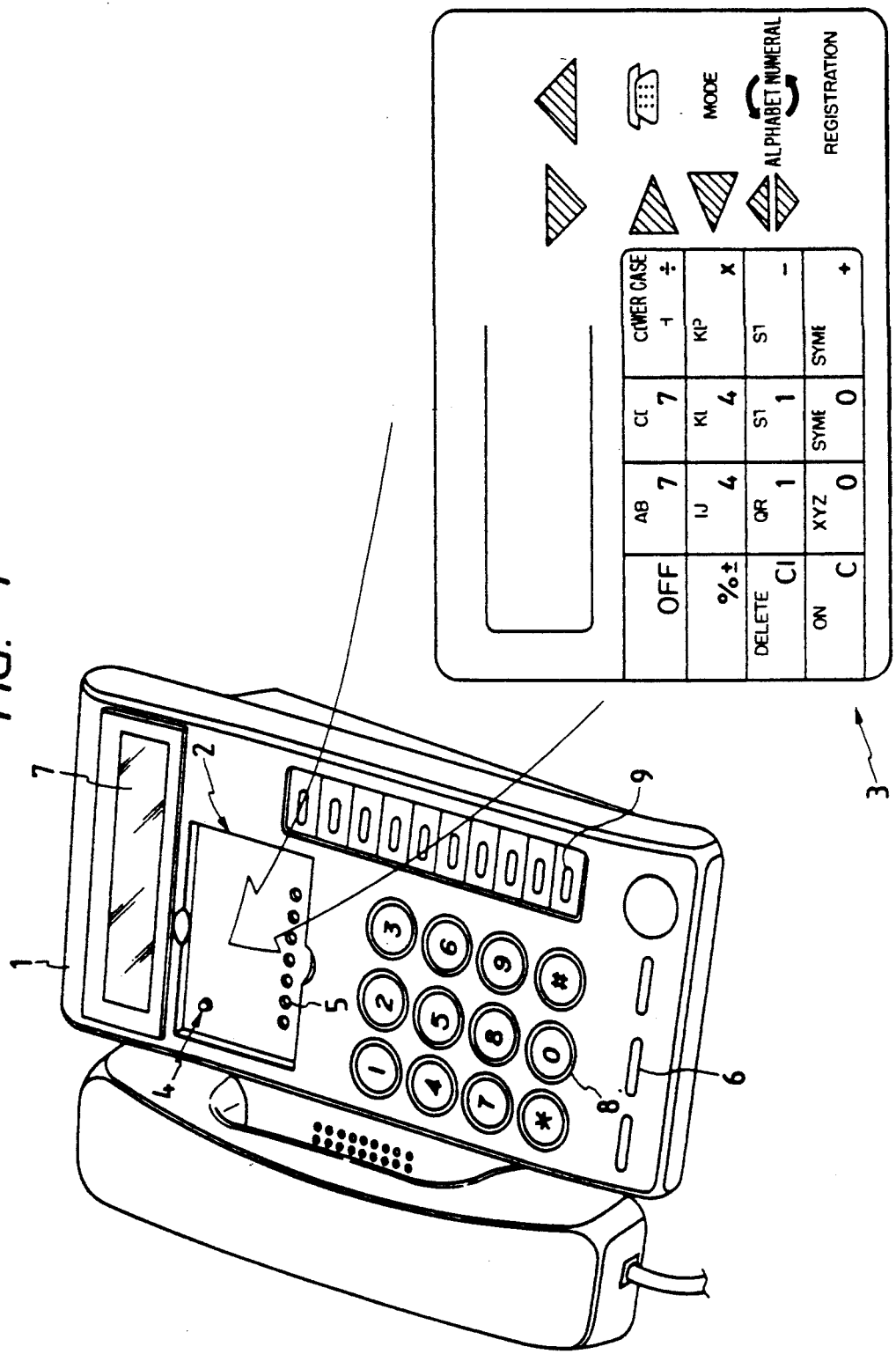
FIG. 1 is a perspective view showing outside appearances of an extension telephone of a telephone system and an electronic notebook according to the first embodiment of the invention.

FIG. 1 is a perspective view showing outside appearances of an extension telephone 1 of a telephone system and an electronic notebook 3 in the first embodiment of the invention.

In the telephone system of the embodiment, a plurality of extension telephones 1 and a local line are selectively connected by a main apparatus, which will be explained hereinlater.

In FIG. 1, an electronic notebook attaching portion 2 is formed on the front surface of the extension telephone 1. The attaching portion 2 is formed into a rectangular concave shape corresponding to the outer peripheral shape of the electronic notebook 3. The electronic notebook 3 is attached onto the attaching portion 2. The attaching portion 2 is provided with: an electronic notebook detection switch 4 comprising a microswitch or the like; and an infrared LED light reception unit 5 comprising seven phototransistors.

On the other hand, the telephone 1 is provided with: setting keys 6 to set various setting data to an exchange or the telephone; a liquid crystal display unit 7 to display a dial number or the like; dial keys 8 to input a dial number; local line keys 9 to select a local line; and the like.

Figure 2:
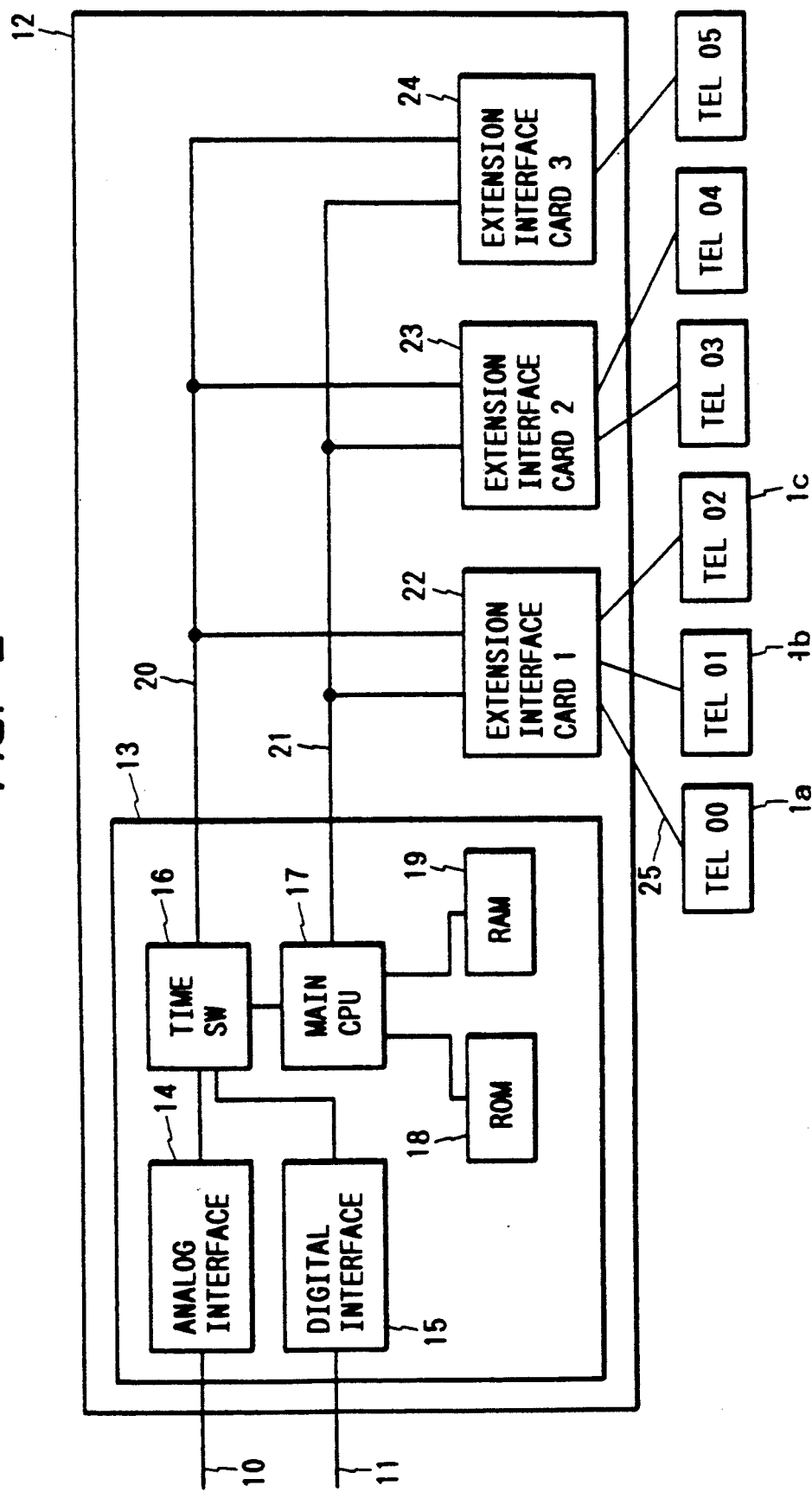
FIG. 2 is a block diagram showing the outline of the system of the first embodiment.

FIG. 2 is a block diagram showing the outline of the system of the embodiment.

A main apparatus 12 encloses therein an analog local line 10 and an ISDN local line 11. An analog interface 14 and a digital interface 15 to execute the interface with each of the local lines 10 and 11, a time switch 16, a main CPU 17, an ROM 18, and an RAM 19 are installed on a main board 13. The main CPU 17 controls each section in accordance with the data stored in the ROM 18 and RAM 19.

On the other hand, three extension interface cards 22 to 24 are provided for the main apparatus 12. The cards 22 to 24 are controlled by the main CPU 17 through a control line 21. A highway 20 is arranged between the time switch 16 and the cards 22 to 24 and is connected to each of telephones 1a, 1b, 1c, . . . through extension transmission paths 25.

Figure 3:
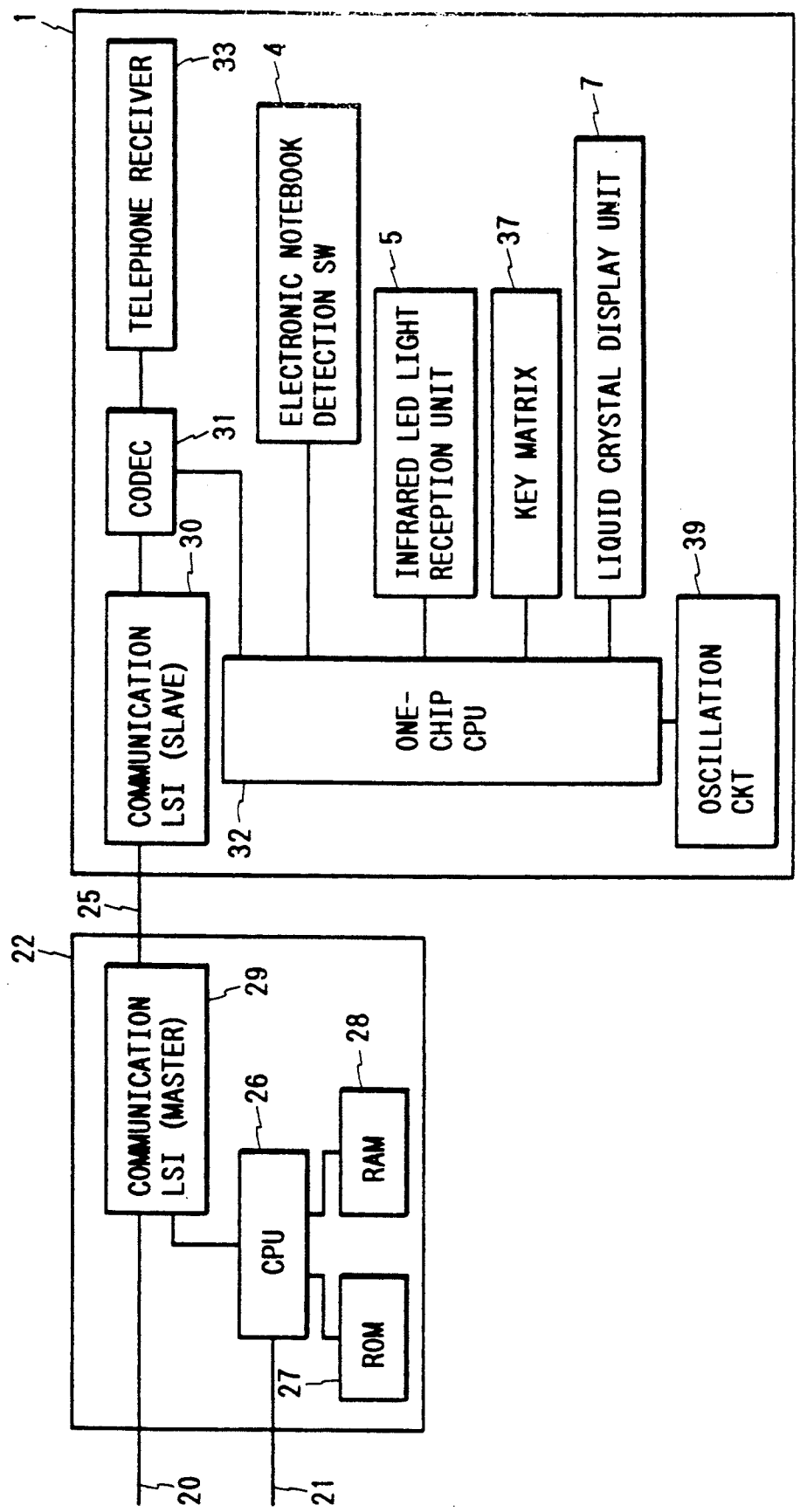
FIG. 3 is a block diagram showing internal constructions of an extension interface card 22 and an extension telephone 1 which are provided for the system of the first embodiment.

FIG. 3 is a block diagram showing internal constructions of the extension interface card 22 and the extension telephone 1.

The card 22 has: a CPU 26 for the extension interface card, an ROM 27; an RAM 28; and an LSI (master) 29 for extension communication.

On the other hand, the extension telephone 1 has: an LSI (slave) 30 for extension communication; a CODEC 31; a one-chip CPU (having therein ports, an ROM, and an RAM) 32; a telephone receiver 33; a key matrix 37; and an oscillation circuit 39. On the other hand, the foregoing electronic notebook detection switch 4, infrared LED light reception unit 5, liquid crystal display unit 7, and the like are provided for the extension telephone 1.

The electronic notebook 3 in the embodiment has a function to register the names or denominations of the partners and the telephone numbers corresponding thereto. In the embodiment, the setting data is also similarly registered.

Figures 4, 6:
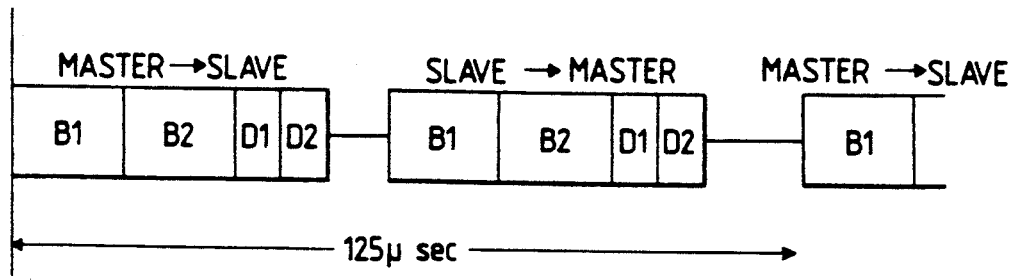
FIG. 4 is an explanatory diagram showing LED light-on patterns of the electronic notebook in the system of the first embodiment.
FIG. 6 is an explanatory diagram showing a burst data format in a ping-pong transmitting method between the telephone and the main apparatus in the system of the first embodiment.

In addition, various input keys such as ten-key, search key, registration key, and the like and a display unit are provided on the surface of the electronic notebook 3. Further, seven infrared LEDs are provided on the back surface of the notebook 3. By lighting on and off the seven infrared LEDs in accordance with patterns as shown in FIG. 4, data is transmitted to the infrared LED light reception unit 5 in a contactless manner.

There are the following setting data.
(1) Type of line
    0: The outside line is connected to the analog public circuit network. (reversible)
    1: The outside line is connected to the analog public circuit network. (unreversible)
    2: The outside line is connected to the private exchange. (reversible)
    3: The outside line is connected to the private exchange. (unreversible)
    4: The outside line is connected to the ISDN.
    5: Nothing is connected to the outside line.
(2) Dialing method
    0: Tone
    1: Pulse (10 pps)
    2: Pulse (20 pps)
    3: Code (ISDN)
(3) Terminating call sound
    1: Terminating call sound 1
    2: Terminating call sound 2
(4) Terminal numbers of the telephones in which a concentrated terminating call is executed
(5) DIL (Direct in-line)
    1: Executed
    2: Not executed
(6) Terminal numbers of the telephones in which the DIL is executed
(7) The necessary time until the released line is again captured
    0: 1.5 seconds
    1: 2.5 seconds The above seven data are set into the electronic notebook 3 for the local lines 10 and 11. For instance,
10=0214140,
11=4325150

The above data means that the local line 10 is set in the following manner.
Analog public circuit network (reversible),
Pulse (20 pps),
Terminating call sound 1,
The terminal No. of the telephone in which the concentrated terminating call is executed is 4,
The DIL is executed,
The terminal No. is 4,
1.5 seconds.
The local line 20 is set in the following manner.
ISDN,
Code,
Terminating call sound 2,
The terminal No. is 5,
The DIL is executed,
The terminal No. is 5,
1.5 seconds.

Obviously, the above modes can be set at arbitrary location and time irrespective of the telephone system. That is, the sales person who has previously heard the contents to be set from the user of the telephone system can also register before he visits the user.

An operating method when transferring data to the telephone and its internal operation will now be described.

FIG. 5 is a flowchart showing the operation when the electronic notebook in the telephone system is used.

First, the user turns on the power source on the telephone system side. Then, the electronic notebook 3 is put onto the attaching portion 2 of the master telephone 1 having a special extension No. (in the embodiment, the telephone of the extension No. 00). In this state, the one-chip CPU 32 of the telephone system detects by the detection switch 4 that the notebook 3 has been placed (S1).

When the operator depresses the setting key 6 of the telephone in this state (S2), the processing routine advances to the setting mode (S3) and the CPU 32 in the telephone 1 recognizes that the data which is subsequently sent is the setting data instead of the telephone number.

Then, the user searches the setting data which was registered as mentioned above.

The setting mode is selected by depressing the mode key on the electronic notebook 3 a few times. A "TEL" key on the notebook 3 is depressed. When the notebook 3 detects the depression of the "TEL" key, the lighting-on operations of the infrared LEDs are executed in accordance with the pattern shown in FIG. 4 corresponding to the numeral and symbol of the setting data.

The infrared LED light reception unit 5 detects the light-on of the infrared LEDs (S4). The result of the detection is converted into the electric signal and input to a port provided in the CPU 32. In the CPU 32, a table similar to that shown in FIG. 4 has previously been provided in the ROM. On the basis of this table, the CPU 32 decodes the data which was input from the light reception unit 5 (S5). Further, the CPU 32 converts the data in accordance with a predetermined format for the setting data (S6). The converted data is sent to the main CPU 17.

The communication among the main CPU 17, the highway 20, and the extension telephone 1 is executed by the ping-pong transmitting method.

That is, a burst of a format shown in FIG. 6 reciprocates on two cables. In FIG. 6, audio data is stored in $B_1$ and $B_2$ channels and transmitted. The control data between the main CPU 17 and the telephone 1, that is, the above converted setting data and the like are stored in a $D_1$ channel and transmitted. On the other hand, a $D_2$ channel is provided as a spare channel. Data transmission rates of the channels are set to 64 kbps for the $B_1$ and $B_2$ channels and to 16 kbps for the $D_1$ and $D_2$ channels. On the other hand, one transmission period of the burst is set to 125 $\mu$sec.

After the power source was turned on, the main CPU 17 executes the polling to the extension telephone 1. When the one-chip CPU 32 of the telephone 1 receives the polling, if data to be transmitted to the main CPU 17 exists, the CPU 32 stores the data into the $D_1$ channel. The setting data which has already been decoded is also sent from the $D_1$ channel. That is, after the one-chip CPU 32 had received the setting data from the electronic notebook 3 and finished the conversion into a predetermined format, if the CPU 32 receives the polling from the main CPU 17, the CPU 32 stores the data into the $D_1$ channel. When the main CPU 17 receives such a data, the CPU 17 determines that the reception data is the setting data on the basis of the data format and updates the content at the corresponding memory location in the RAM 19 in which various setting data have been stored (S7).

As mentioned above, various setting data can be easily set.

The operating method and the operation when transmitting data by using the electronic notebook 3 will now be described.

In this case, after the electronic notebook 3 was put onto the attaching portion 2, the setting key 6 of the telephone 1 is not depressed in step S2.

Due to this, the transmission mode is selected (S8). For instance, if the operator wants to transmit data to Mr. AOKI, he depresses the search key on the electronic notebook 3 a few times and selects the term of "AOKI". After the operator selected the line by depressing the local line key 9, he depresses the "TEL" key of the electronic notebook 3. The electronic notebook 3 which detected the depression of the "TEL" key lights on the infrared LEDs of the pattern shown in FIG. 4 corresponding to the telephone number.

The infrared LED light reception unit 5 detects the light-on operations of the LEDs (S9) and converts the result of the detection into the electric signal and inputs to the port provided in the CPU 32.

The CPU 32 decodes the input data on the basis of the table shown in FIG. 4 which has previously been stored in the ROM (S10). Further, the CPU 32 converts the data in accordance with a predetermined format as the data for transmission (S11). The converted data is sent to the main CPU 17 in a manner similar to the case of the setting data mentioned above.

In the case where the line selected by the operator relates to an analog network, the main CPU 17 transmits a dial pulse or a dial tone in accordance with the received data. On the other hand, if the selected line is a digital network, the CPU 17 sends a SETUP message in accordance with the received data (S12). At this time, the main CPU 17 reads out the dialing method from the RAM 19 in response to the depressed local line key 9 and executes an originating call in accordance with the read dialing method.

The transmitting operation can be easily and conveniently executed as mentioned above.

In the above first embodiment, the communication between the electronic notebook 3 and the telephone 1 has been executed by lighting on the seven LEDs. However, the similar effect can be also expected even by another construction.

For instance, even if a construction to transmit and receive an electric signal is provided between the electronic notebook 3 and the telephone 1, data can be sent to the telephone in a serial or parallel data format. As a construction to transmit and receive the electric signal, it is possible to use a construction of the contactless type using a transformer coupling or a construction in which electrodes come into contact with each other.

On the other hand, a circuit to generate an voice frequency band signal such as MF signal, PB signal, or the like is provided for the electronic notebook, and data can be also transmitted by acoustic means.

Further, in the first embodiment, the electronic notebook detection button has been used to detect the electronic notebook. However, the similar effect can be also expected even by using an optical sensor.

In addition to the telephone, a terminal to communicate image data can be also used as an extension terminal.

The invention is not limited to the key telephone but can be also applied to a single line telephone which is directly connected to the public circuit.

According to the embodiment, since data can be set by using the electronic notebook which is provided separately from the apparatus main body, data can be input at an arbitrary location irrespective of the position where the telephone system was installed. Therefore, data can be input at a desired time of the operator and the business efficiency can be raised.

On the other hand, the sales person prepares an electronic notebook in which a plurality of different setting data have been registered and slightly changes the data which is nearest to a demand of the user among the previously registered plurality of kinds of data, so that he can further easily and conveniently input the data. Thus, the business efficiency can be also raised.

Moreover, if the user preliminarily informs a desired setting content to the sales person by using a facsimile apparatus or the like when the user wants to request the sales person to input or change the data, when the sales person visits the user, the data can be soon input or changed by the sales person. As mentioned above, according to the embodiment, an advantage such as improvement of the services can be obtained.

Second Embodiment

FIG. 7 is a perspective view showing outside appearances of an extension telephone 51 of a telephone system and an electronic notebook 53 according to the second embodiment of the invention.

In the telephone system of the second embodiment, a plurality of extension telephones 51 and a local line are selectively connected by a main apparatus, which will be explained hereinlater.

In FIG. 7, an electronic notebook attaching hole 52 is formed in the side portion of the extension telephone 51. The attaching hole 52 is formed into a slit shape adapted to insert the electronic notebook 53. By inserting the electronic notebook 53 from the hole 52, the electronic notebook 53 can be set into the attaching portion in the telephone 51. The attaching portion is provided with: an electronic notebook detection switch comprising a microswitch or the like; a positioning mechanism of the electronic notebook 53; contacts to transmit and receive data with the electronic notebook 53; and the like.

On the other hand, the telephone 51 comprises: a first notebook key 54 to register data into the electronic notebook 53; a second notebook key 55 to transfer data from the electronic notebook 53; a search key 68 to search the data in the electronic notebook 53; a setting key 56 to set various setting data into the exchange or the telephone; a liquid crystal display unit 57 to display a dial number or the like; dial keys 58 to input a dial number; local line keys 59 to select the local line; and the like.

The outline of the telephone system of the second embodiment is common to FIG. 2.

Figure 8:
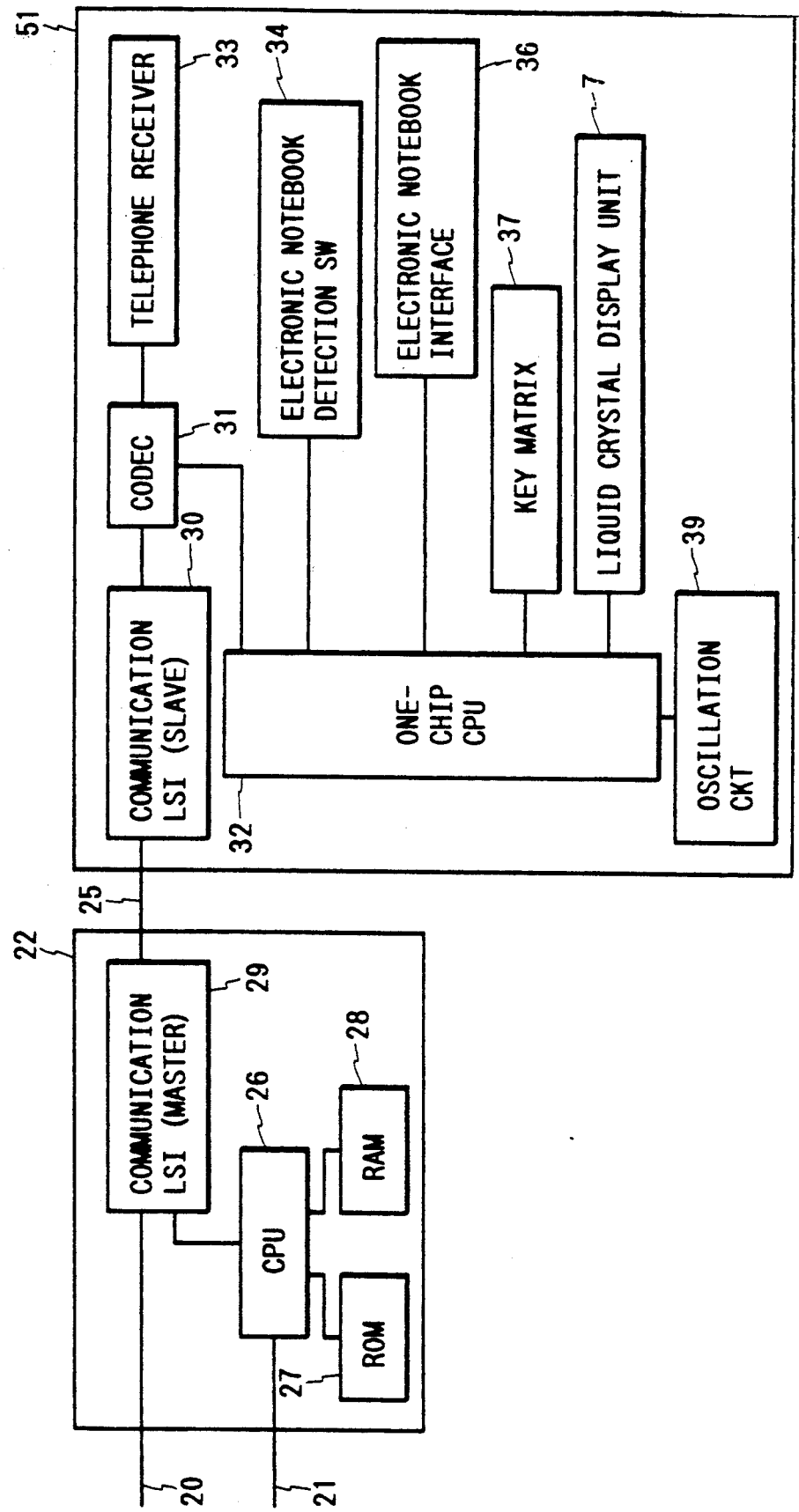
FIG. 8 is a block diagram showing internal constructions of an extension interface card and an extension telephone which are provided for the system of the second embodiment.

FIG. 8 shows constructions of the extension interface card 22 and the extension telephone 51. In FIG. 8, the parts and components which are common to those in FIG. 3 are designated by the same reference numerals. Reference numeral 36 denotes the electronic notebook interface having contacts to communicate with the electronic notebook 53.

On the other hand, various input keys such as ten-key, search key, registration keys, and the like and a display unit are provided on the surface of the electronic notebook 53. Various data can be registered by the sole electronic notebook. Further, contacts which come into contact with the contacts on the side of the telephone 51 are provided for the electronic notebook 53.

The names or denominations of the partners and the telephone numbers corresponding thereto are previously registered in the electronic notebook 53 in the second embodiment. In the embodiment, the setting data for the main apparatus is also similarly registered.

FIG. 9 is a flowchart showing the operation in the case where the electronic notebook in the telephone system is used.

The method of inputting data into the electronic notebook 53 will now be described.

First, the registering method of ordinary names of persons and their telephone numbers will be explained. To input alphabetic characters by the ten-key 58, it is sufficient to assign such that "01" to "A", "02" to "B", and the like.

For instance, if the name which the operator wants to register is "AOKI" and the telephone number is "123-4567", the electronic notebook 53 is attached (S31) and the first notebook key 54 is depressed (S33). Thus, the mode to transfer data from the telephone 51 to the side of the electronic notebook 53 is set (S34). After that, the buttons are depressed in accordance with the following order (S35).

\*, 0, 1, 1, 5, 1, 1, #, 1, 2, 3, 4, 5, 6, 7, #

On the other hand, in association with the operations of the buttons as mentioned above, contents as shown in FIG. 10 are displayed in the liquid crystal display unit 57 of the telephone 51 (S36).

With reference to the display contents, the user confirms that the input data is correct (S37) and depresses the first notebook key 54 (S38), so that the CPU 32 transfers the data to the electronic notebook 53 (S39). The data is stored into the RAM in the electronic notebook 53 (S40). The data transmitting method from the telephone 51 to the electronic notebook 53 is based on a start-stop synchronizing method. The data format is based on the JIS code.

The method of registering setting data into the telephone system will now be described.

First, the electronic notebook 53 is attached (S31) and the first notebook key 54 is depressed (S33), so that the mode to transfer data from the telephone 51 to the electronic notebook 53 side is set (S34). If the data to be set is similar to that in the first embodiment, the buttons are depressed in accordance with the following order (S35).

\*, \*, 1, 0, #, 0, 2, 1, 4, 1, 4, 0

"01" indicates the registration data number and "0214140" represents the setting data. After that, in a manner similar to the telephone number, the setting data is stored into the RAM in the electronic notebook 53 (S40).

Many setting data can be registered by the above procedure.

Figures 10, 11:
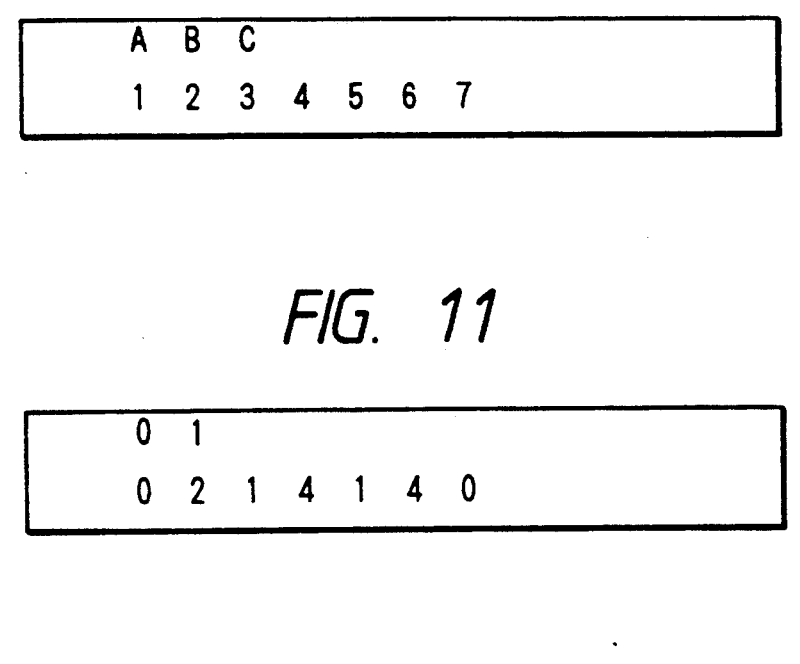

FIG. 11 is a plan view showing an example of the display contents of the display unit 57 when the setting data mentioned above was registered.

The above setting operation can be also obviously executed at arbitrary location and time irrespective of the position of the telephone system installed.

The operating method and the operation when data is transferred to the telephone will now be described.

First, the user attaches the electronic notebook 53 (S31) and depresses the second notebook key 55 (S32), so that the mode to transfer the data from the electronic notebook 53 to the telephone 51 side is set (S41).

The one-chip CPU 32 requires the data transfer to the electronic notebook 53 through the electronic notebook interface 36.

On the other hand, the data selected at this time point on the side of the electronic notebook 53 is transferred to the telephone 51 side (S42) and displayed in the display unit 57 (S43). Now, when the user depresses the search key 68 (S14), the CPU 32 requires the transfer of the next data to the electronic notebook 53 through the interface 36. In response to the request from the CPU 32, the electronic notebook 53 outputs the data registered in the next memory area. The CPU 32 allows the input data to be displayed in the display unit 57 through the interface 36. As mentioned above, the other data can be selected. After confirming that the desired data was selected and displayed, if the setting operation of the telephone system is executed by the selected data, by depressing the setting key 56 (S45), the CPU 32 converts the data in accordance with a preset setting data format (S46) and sends to the main CPU 17.

The main CPU 17 recognizes that the reception data is the setting data on the basis of the data format and updates the contents in the RAM 19 on the basis of the setting data (S47).

On the other hand, in the case of transmitting by the data from the electronic notebook 53, the operator depresses the local line key 59 (S48). Thus, the CPU 32 converts the data into a predetermined transmission data format (S49) and sends to the main CPU 17. The data transmission is executed on the basis of the data.

The communication among the main CPU 17, the time switch 16, and the extension telephone 51 is executed by the ping-pong transmitting method.

That is, a burst of the format shown in FIG. 6 reciprocates on two cables. In FIG. 6, the voice data is stored into the $B_1$ and $B_2$ channels and transmitted. The control data between the main CPU 17 and the telephone 51, that is, the above converted setting data and the like are stored into the $D_1$ channel and transmitted. On the other hand, the $D_2$ channel is a spare channel. The data transmission rates of the channels are set such that 64 kbps is set for the $B_1$ and $B_2$ channels and 16 kbps is set for the $D_1$ and $D_2$ channels. One transmission period of the burst is set to 125 $\mu$sec.

After the power source was turned on, the main CPU 17 executes the polling to the extension telephone 51. When the extension telephone 51 receives the polling, if the data to be sent to the main CPU 17 exists, the telephone 51 stores the data into the $D_1$ channel. The data which has already been decoded is also sent by the $D_1$ channel. That is, after the data had been received from the electronic notebook 53 and the conversion into a predetermined format was finished, if the polling is received from the main CPU 17, the data is stored into the $D_1$ channel. If the received data is the setting data, the main CPU 17 updates the content at the corresponding memory location in the RAM 19 in which various setting data has previously been stored. On the other hand, if the received data is the data for transmission, when the circuit to transmit relates to the analog network, a dial pulse or a dial tone is transmitted in accordance with the received data. If the circuit to transmit relates to the digital network, the SETUP message is sent in accordance with the received data.

As mentioned above, various setting data can be easily and conveniently set and transmitted.

In the above embodiment, since the data on the side of the telephone main body can be transmitted to the electronic notebook, the data which was once transferred from the electronic notebook to the telephone side can be transmitted and registered to another electronic notebook. That is, a copying process of the electronic notebook can be also easily performed.

In the second embodiment, although the communication between the electronic notebook and the telephone has been executed by the start-stop synchronizing method of the electronic signal, the similar effect can be also expected by other method.

For instance, a construction to transmit and receive a photo signal is provided between the electronic notebook 53 and the telephone 51 and data can be transmitted to the telephone in a serial or parallel data format.

On the other hand, means for generating a voice frequency band signal such as MF signal, PB signal, or the like is provided for the electronic notebook and data can be also sent by acoustic means.

The invention is not limited to the key telephone but can be also applied to a single line telephone (SLT).

According to the embodiment, in a state in which the electronic notebook was attached to the telephone main body, the key input data of the telephone main body is transmitted to the electronic notebook and the electronic notebook can be made operative on the basis of the key input data. Therefore, in such an attaching state, there is no need to operate the operation buttons of the electronic notebook and the operability in a state in which the electronic notebook was attached to the telephone can be improved.

On the other hand, with the construction in which the data on the telephone main body side can be transmitted to the electronic notebook, the data which was once transferred from the electronic notebook to the telephone main body side can be transmitted and registered to other electronic notebook. The copying process of the electronic notebook can be easily executed.

Although the present invention has been described on the basis of the preferred embodiments, the invention is not limited to the constructions of the above embodiments but many modifications and variations are possible within the spirit and scope of the appended claims of the invention.

What is claimed is:

1. A memory card capable of being connected to telephone, comprising:
    setting means for setting designation information designating whether a line is a digital line or an analog line;
    memory means for storing therein the designation information; and
    transmission means for transmitting the designation information stored in said memory means.

2. A memory card according to claim 1, wherein said setting means comprises a keyboard.

3. A memory card according to claim 1, wherein said transmission means comprises light emitting diodes.

4. A memory card according to claim 1, wherein the digital line includes an ISDN.

* * * * *

UNITED STATES PATENT AND TRADEMARK OFFICE
CERTIFICATE OF CORRECTION

PATENT NO. : 5,245,653
DATED : September 14, 1993
INVENTOR(S) : MICHIHIRO IZUMI

It is certified that error appears in the above-identified patent and that said Letters Patent is hereby corrected as shown below:

COLUMN 6

Line 58, "an" should read --a--.

COLUMN 9

Line 10, "(S14)," should read --(S44),--.

COLUMN 10

Line 16, "other" should read --another--.
Line 42, "other" should read --another--.
Line 52, "telephone," should read --a telephone,--.
Line 63, "light emitting" should read --light-emitting--.

Signed and Sealed this

Twentieth Day of September, 1994

Attest:

BRUCE LEHMAN

*Attesting Officer*     *Commissioner of Patents and Trademarks*